United States Patent [19]

Prew

[11] Patent Number: 4,493,556
[45] Date of Patent: Jan. 15, 1985

[54] METHOD AND APPARATUS FOR MIXING PARTICULATE MATERIAL

[75] Inventor: Stanley R. Prew, Montoursville, Pa.

[73] Assignee: Koppers Company, Inc., Pittsburgh, Pa.

[21] Appl. No.: 467,957

[22] Filed: Feb. 18, 1983

[51] Int. Cl.³ .............................................. B01F 11/00
[52] U.S. Cl. ..................................................... 366/114
[58] Field of Search .................... 222/203; 366/31, 32, 366/108, 109, 110, 114, 115

[56] References Cited

U.S. PATENT DOCUMENTS

| | | | |
|---|---|---|---|
| 3,297,304 | 1/1967 | Wahl . | |
| 3,363,806 | 1/1968 | Blakeslee | 366/114 |
| 3,400,728 | 9/1968 | DiGennaro . | |
| 3,429,560 | 2/1969 | Huber . | |
| 3,507,686 | 4/1970 | Hagenbach | 366/110 |
| 3,556,352 | 1/1971 | Roberts | 222/203 |
| 3,687,420 | 8/1972 | Schweinfurth . | |
| 4,023,776 | 5/1977 | Greten . | |
| 4,232,972 | 11/1980 | Levin | 366/108 |

Primary Examiner—Robert W. Jenkins
Assistant Examiner—Arthur D. Dahlberg
Attorney, Agent, or Firm—Daniel J. Long; Herbert J. Zeh, Jr.

[57] ABSTRACT

A method and apparatus for mixing granular, particulate or pulverant material is disclosed. An unhomogenous mixture of two or more such materials is introduced into and moved through a preferably inclined trough structure having rigid side walls and a flexible floor member. At one or more isolated positions on this floor member it is subjected to relatively intense vibrational motion. It is found that such restricted use of vibrational motion results in a thorough yet gentle mixing of granular, particulate or pulverant materials.

11 Claims, 2 Drawing Figures

4,493,556

METHOD AND APPARATUS FOR MIXING PARTICULATE MATERIAL

BACKGROUND OF THE INVENTION

1. Field of the Invention

The present invention deals with the mixing of granular, particulate or pulverant material and in particular deals with methods or devices for mixing such materials by means of vibrating motion.

2. Description of the Prior Art

Various general methods and types of devices are known for the purpose of mixing two or more types of granular, particulate or pulverant materials. Such materials are commonly mixed, for example, by means of rotary movement in which material is charged into a closed mixing vessel which is then rotated about its own or some external axis. It is found, however, that such rotating motion often induces mixing in whole layers of material so that pockets of unmixed material may be found in the finished mixture. Alternatively, it is also conventional to mix such materials by means of rotating paddles. While this method often obtains a more homogenous final product than would be possible by means of a rotating closed vessel, it is found that the impacting of the rotating parts on the particles to be mixed may in some cases cause unacceptable degradation of such particles. Furthermore, the direct contact between the rotating paddles and the particles to be mixed may result in the incurrance of high costs for the purpose of maintaining and cleaning the mixing apparatus.

In view of the above described disadvantages, it has been suggested that particulate and pulverant materials be mixed by means of vibratory motion. U.S. Pat. No. 3,297,304, for example, discloses a vibratory mixer in which a stream of particulate material flows along the longitudinal axis of a vibrating trough and in which a plurality of flat inclined members are positioned at intervals along the trough's longitudinal axis. The upstream end of each of these members is in engagement with the trough bottom and the downstream end spaced above the trough bottom. Thus, the material to be mixed passes over each of the inclined members and as it is discharged it will be subject to a folding action as it falls from the elevated downstream ends of these members.

Another vibratory mixer is disclosed in U.S. Pat. No. 3,687,420. In this apparatus an inclined trough contains a mass of pulverant material, which due to the lengthwise decline of the trough moves slowly from the upper end to the lower discharge end of the trough. The entire trough is vibrated in an upward and downward direction along a path perpendicular to its longitudinal axis. Because of this vibration, the material in the trough tends to move or roll in a closed path with the material in contact with the trough moving toward and up the side of the trough and with the material on top sliding down toward the low side of the mass of material.

Although the above described vibratory mixing devices avoid problems associated with rotating or paddle mixers, they do involve the necessity of vibrating a large part, if not all, of the conveying structure. It is believed that certain efficiencies might be realized by applying vibratory motion in a more selective manner. It is, therefore, the object of the present invention to provide a method and apparatus for mixing particulate or pulverant material in which vibratory motion need only be applied at certain selected times and positions.

SUMMARY OF THE INVENTION

The present invention comprises a method for mixing granular, particulate or pulverant materials and an apparatus for carrying out this method. This apparatus includes a trough structure having rigid side walls between which there is interposed a flexible floor member. This trough structure also has a concave-shaped roof member. Preferably the trough is inclined so that when a layer of material to be mixed is introduced on its upper end that material will flow slowly downwardly in a continuous layer over the flexible floor member and then be discharged at its lower end. At one or more isolated positions along this path from the upper end of the trough to the lower end this layer of particles will be subjected to relatively intense vibrational motion by means of a generally vertically oscillating plunger which impacts against the lower side of the flexible floor member at an approximately constant frequency and at an angle which is perpendicular to the longitudinal axis of the trough. This vibrational activity will be sufficiently great so that the particles from the layer of material to be mixed will become airborne. The concave shape of the roof member will then tend to direct these particles on a traverse path so that a gentle yet thorough mixing will occur without the necessity of expending large amounts of energy in vibrating the entire mixing apparatus.

BRIEF DESCRIPTION OF THE DRAWINGS

The present invention is further described in the accompanying drawings in which.

DETAILED DESCRIPTION

Figures 1, 2:
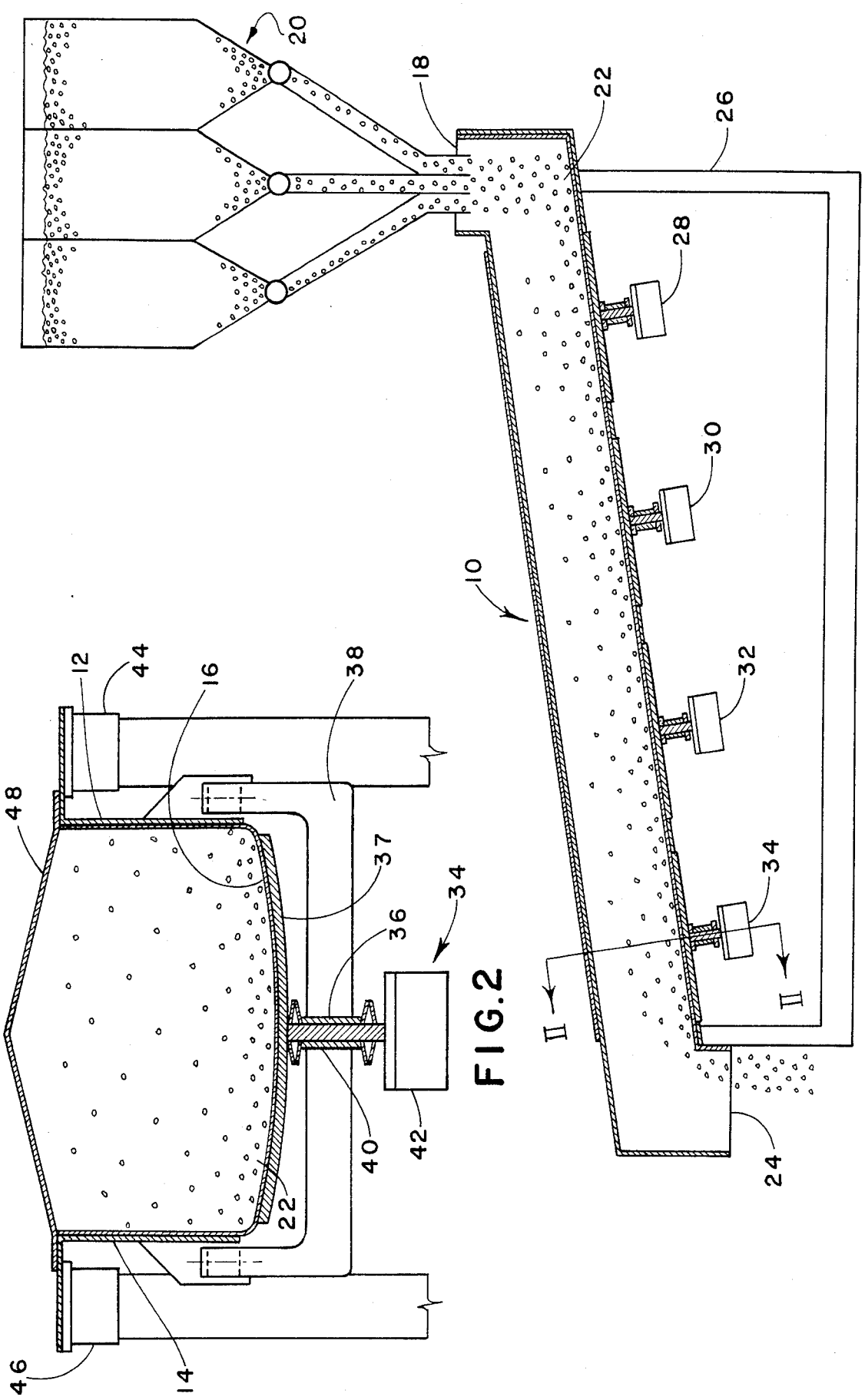
FIG. 1 is a schematic side elevational view of a mixing apparatus representing a preferred embodiment of the present invention.
FIG. 2 is a cross-sectional view of such a mixing apparatus taken through line II—II in FIG. 1.

Referring to the drawings, it will be observed that the mixing apparatus of the present invention includes a trough shown generally at numeral 10. This trough is mounted in an inclined position by means of frame 11, and it includes a pair of rigid opposed longitudinal side walls 12 and 14. The trough also includes an integral flexible floor member 16 which preferably is of an elastomeric material such as natural rubber. At the top end of the trough there is an upper inlet 18 through which two or more types of granular, particulate or pulverant material are received from a metering system shown generally at numeral 20. The metering system from which this material is introduced includes integral hoppers, metering devices and screw conveyors. Such systems are well known in the art and may be obtained, for example, from Vibra-Screw, Inc. of Totowa, New Jersey. With respect to the material introduced, it will be understood that the apparatus and method of the present invention may be adapted to mix a wide range of materials which may be commonly referred to as being granular, particulate or pulverant. This apparatus and process may also be adapted for mixing such materials with a liquid or viscous substance. For the sake of brevity, however, all such materials and mixtures with other substances will be referred to hereinafter as "particulate" materials regardless of whether in common parlance such materials may be more frequently referred to as being granular or pulverant.

A layer of such a particulate material is shown at numeral 22. This layer is formed over the flexible floor member 16 and due to the slope of the trough flows downwardly along the longitudinal axis of the trough to be continuously discharged at the lower outlet 24 at the bottom end of the trough. Frame 26 maintains the trough in its inclined position.

Along the length of the trough there are one or more impacting devices as at 28, 30, 32 and 34. Referring particularly to FIG. 2, it will be seen that each of these impacting devices includes generally a plunger as at 36, a plunger head as at 37 which impacts against the underside of the flexible floor member, a plunger mounting frame as at 38 and a plunger guide as at 40. A drive means as at 42 is provided to oscillate the plunger in a linear upward then downward continuously reversing motion. Drive means 42 may be any of the well known devices for producing linear oscillating motion such as a rotating drive mechanism used in conjunction with a cam and follower type arrangement or a pneumatic or solenoid powered drive mechanism.

From FIG. 2, it will also be seen that the apparatus of the present invention is equipped with isolation mounts 44 and 46 to prevent vibration imparted to the trough from being transmitted to the building in which the apparatus is housed. FIG. 2 also shows that a concave-shaped roof member 48 covers the trough.

From FIG. 1, it will be observed that the impacting devices are arranged so that their plungers move in a direction perpendicular to the longitudinal axis of the trough 10 and impact against the flexible floor member 16 at a point on its longitudinal center line. The plunger heads also preferably impact against the flexible floor member at a substantially constant frequency. It is believed that for most particulate materials that best results are achieved if the plunger impacts against the flexible floor member at a velocity of from about 3 to 11 feet per second and at a frequency of about 5 to 20 hertz although optimum velocity and frequency may vary with the nature of the materials to be mixed and may depend, especially, on the coefficient of restitution of such materials. In any case the velocity of the plunger should be high enough such that sufficient kinetic energy is transmitted to the layer of particulate material so that most particles are projected upwardly and away from the layer. Because of the concave shape of the roof 48, the trajectories followed by these particles will be predominantly transverse with respect to the trough so that particles will tend to be thrown from one side of the longitudinal center line of layer 20 to the other.

The method of the invention is further described in the following examples. In each of these examples an apparatus similar to the one described above was employed. The trough structure was 12 inches wide and the flexible floor member consisted of a 1/16 inch thick sheet of natural rubber. The combined weight of the plunger and plunger head in the impacting devices was about 3.5 pounds. The plunger head dimensions were each 9 inches by 9 inches and they were spaced 12 inches apart from center to center along the longitudinal axis of the trough. Four impacting devices were used and they were operated in these examples at the following frequencies and velocities: 5 hertz and 3 feet per second, 10 hertz and 6 feet per second, 15 hertz and 9 feet per second, and 20 hertz and 12 feet per second.

EXAMPLE 1

An unhomogenous mixture of flour and sand being 84.8 percent by weight sand and 15.2 percent by weight flour was introduced into the apparatus. The density of the flour was 24.8 pounds per cubic foot and the density of the sand was 95 pounds per cubic foot. The rate of flow of this material through the inclined trough was 6,000 pounds per hour. The impacting devices were operated at the above stated frequencies and impact velocities and it was ascertained that a superior homogenous mixture was obtained at a frequency of 5 hertz and at an impact velocity of about 3 feet per second.

EXAMPLE 2

Ground corn having a density of about 40 pounds per cubic foot was screened to obtain one cut from 7 to 16 mesh making up 58.9 percent by weight of the entire mixture and a second cut from 16 to 30 mesh making up 41.1 percent by weight of the mixture. This unhomogenous mixture was introduced into the apparatus. The flow rate was 3,138 pounds per hour. The impacting devices were operated at the above stated frequencies and velocities and it was ascertained that a superior homogenous mixture was obtained at a frequency of 10 hertz and at an impact velocity of about 6 feet per second.

EXAMPLE 3

An unhomogenous mixture of two sizes of plastic, capsule-shaped pellets was introduced into the apparatus. The pellets had an approximate density of 35 pounds per cubic foot. One sized pellet was ⅛ inch in length and ⅛ inch in diameter and made up about 40 percent by weight of the mixture. The other sized pellet was ⅛ inch in length and 1/16 inch in diameter and was about 60 percent by weight of the mixture. A flow rate of 3,468 pounds per hour was maintained. The impacting devices were operated at the above stated frequencies and velocities and it was ascertained that a superior homogenous mixture was obtained at a frequency of 10 hertz and at an impact velocity of about 6 feet per second.

It will thus be appreciated that a method and apparatus has been described for mixing particulate materials by concentrating a relatively high level of vibrational activity at a particular place in that apparatus or at a particular time in that process. Although the invention has been described with a certain degree of particularity, it is to be understood that the present disclosure has been made only as an example and that the scope of the invention is defined by what is hereafter claimed. In particular, it will be understood that it is not essential that the trough be inclined. If some means are provided to move the particulate material to be mixed through the trough, it would be possible to employ a substantially horizontal trough. An example of such an adaptation of the above described preferred embodiment would be the substitution of a moving, continuous belt for the flexible floor member and the substitution of a horizontal trough for the inclined trough. It will also be appreciated that instead of using a concave-shaped roof which is raised at its center and slopes downwardly to both sides of the trough, it would be within the scope of the present invention to employ a roof member on the trough which slopes first toward one lateral wall and then toward the opposite lateral wall over alternate longitudinal sections of the trough. By means of such an arrangement the transverse trajectories of airborne particles will be predominantly first to one side of the layer and then to the other side of the layer over alternating longitudinal sections of the trough rather than being simultaneously oppositely directed as is the case with a concave-shaped roof.

I claim:

1. An apparatus for mixing particulate material comprising:
(a) a downwardly inclined trough structure having a pair of rigid opposed longitudinal side walls and a flexible floor member interposed between said side walls and said flexible floor member having an upper and a lower side;
(b) upper inlet means for superimposing a continuous, longitudinally flowing layer of particulate material over the upper side of said flexible floor member;
(c) lower outlet means for continuously removing particulate material from said trough structure;
(d) reans for repeatedly impacting a restricted area of the lower side of the flexible floor member with sufficient energy to cause particulate material in said layer to be projected upwardly so as to become airborne above said layer; and
(e) means for directing said airborne particles in a transverse direction over said layer.

2. An apparatus for mixing particulate material comprising:
(a) a generally horizontal trough structure having a pair of rigid opposed longitudinal side walls and a flexible floor member interposed between said side walls and said flexible floor member having an upper and a lower side;
(b) inlet means for superimposing a continuous layer of particulate material over the upper side of said flexible floor member;
(c) means for moving said layer of particulate material in a longitudinal direction through said trough;
(d) outlet means for continuously removing particulate material from said trough structure;
(e) means for repeatedly impacting a restricted area of the lower side of the flexible floor member with sufficient energy to cause particulate material in said layer to be projected upwardly so as to become airborne above said layer; and
(f) means for directing said airborne particles in a transverse direction over said layer.

3. The apparatus as recited in claim 1 or 2 wherein the flexible floor member is elastomeric.

4. The apparatus as recited in claim 1 or 2 wherein the means for impacting the lower side of the flexible floor member has an impacting member which oscillates at a substantially constant frequency in a linear path generally perpendicular to the longitudinal axis of the trough.

5. The apparatus as recited in claim 1 or 2 wherein the impacting member oscillates at a frequency of from about 5 to 10 hertz and at an impact velocity of from about 3 to 6 feet per second.

6. The apparatus as recited in claim 1 or 2 wherein a plurality of separate means for continuously impacting the lower side of the flexible floor member are spaced at longitudinal intervals beneath the trough.

7. The apparatus as recited in claim 1 or 2 wherein the means for directing airborne particles in a transverse direction is a concave-shaped roof member superimposed over the trough and being elevated along its longitudinal axis and sloping laterally and downwardly therefrom to abut the opposed rigid side walls.

8. A method for mixing particulate material comprising the steps of:
(a) introducing a layer of particulate material into a downwardly inclined trough having rigid side walls with a flexible floor member having upper and lower sides interposed therebetween such that said layer is superimposed over the upper side of said flexible floor member and flows longitudinally through said trough;
(b) repeatedly impacting a restricted area of the lower side of the flexible floor member with sufficient energy to cause particulate material in said layer to be projected upwardly so as to become airborne above said layer; and
(c) directing said airborne particles in a transverse direction over said layer.

9. A method for mixing particulate material comprising the steps of:
(a) introducing a layer of particulate material into a generally horizontal trough structure having rigid side walls with a flexible floor member having upper and lower sides interposed therebetween such that said layer is superimposed over the upper side of said flexible floor member;
(b) longitudinally moving said layer through said trough structure;
(c) repeatedly impacting a restricted area of the lower side of the flexible floor member with sufficient energy to cause particulate material in said layer to be projected upwardly so as to become airborne above said layer; and
(d) directing said airborne particles in a transverse direction over said layer.

10. The method as recited in claim 8 or 9 wherein impacting force is applied at a substantially constant frequency in a direction perpendicular to the longitudinal axis of the trough structure.

11. The method as recited in claim 8 or 9 wherein impacting force is applied at a frequency of from about 5 to 10 hertz and at an impact velocity of from about 3 to 6 feet per second.

* * * * *